United States Patent [19]
Nolde

[11] Patent Number: 6,115,456
[45] Date of Patent: Sep. 5, 2000

[54] REMOTE CONTROL SYSTEM

[75] Inventor: Keith Eric Nolde, Suffolk, United Kingdom

[73] Assignee: British Telecommunications public limited company, London, United Kingdom

[21] Appl. No.: 08/679,215

[22] Filed: Jul. 12, 1996

[30]  Foreign Application Priority Data

Jan. 4, 1996 [GB] United Kingdom .................... 9600096

[51] Int. Cl.$^7$ ................................................. H04M 11/00
[52] U.S. Cl. .............................. 379/102.01; 379/102.07; 379/90.01; 379/106.01
[58] Field of Search ......................... 379/102.01, 102.03, 379/102.04, 102.05, 102.07, 106.01, 106.03, 90.01

[56]  References Cited

U.S. PATENT DOCUMENTS

| | | | |
|---|---|---|---|
| 4,899,217 | 2/1990 | MacFadyen et al. | 379/102.01 |
| 4,996,703 | 2/1991 | Gray | 379/102.05 |
| 5,051,720 | 9/1991 | Kittirutsunetorn . | |
| 5,086,385 | 2/1992 | Launey et al. | 379/102.01 |
| 5,434,973 | 7/1995 | Lu | 379/102.01 |
| 5,544,036 | 8/1996 | Brown, Jr. et al. | 379/102.05 |
| 5,729,596 | 3/1998 | Reeder et al. | 379/106.01 |

FOREIGN PATENT DOCUMENTS

| | | |
|---|---|---|
| 3831762 A1 | 6/1989 | Germany . |
| WO 89/11194 | 11/1989 | WIPO . |
| WO 95/28792 | 10/1995 | WIPO . |

*Primary Examiner*—Stella Woo
*Attorney, Agent, or Firm*—Nixon & Vanderhye P.C.

[57]  ABSTRACT

A remote control system for controlling electrical apparatus in customer premises includes a home control interface for connection by way of network termination equipment, e.g., a telephone socket, to a communications line to a telephone exchange. The home control interface is responsive to signals received from a home control platform connected to the telephone network to control electrical apparatus by way of module interfaces. The home control interface is arranged on demand to transmit signals to the communications line indicative of the current status of each piece of electrical apparatus connected to the system. The consumer may use a telephone to pre-record a definition of the electrical apparatus attached to each connection on the module interface which, when remote control requests are forwarded to the home control platform are used to define the respective switch and to announce its status to the caller. The home control platform has capability of storing substantial quantities of data defining changes required in switching at different times.

21 Claims, 10 Drawing Sheets

REMOTE CONTROL SYSTEM

BACKGROUND OF THE INVENTION

1. Field of the Invention

The present invention relates to a remote control system and more particularly to a remote control system utilising the public switched telephone network.

2. Related Art

Existing remote control systems often require a dedicated telecommunications link or a dedicated telecommunications number for access purposes. Such solutions are either expensive to implement because of the requirement for a dedicated line or may be expensive to access because of the requirement to set up a dedicated telephone call. Furthermore, particularly for domestic installation purposes, the amount of sophistication which can be built into a system is very limited.

It will also be appreciated that competing demands even on domestic telephone lines during the occupiers absence can be substantial. Thus, for example, a fax machine and an answering machine may share the line with normal telecommunications. While fax switches have been developed to enable, on call answer, the identification of calls to fax machines and if not to transfer the call to an answering machine introduction of a further possibility will complicate domestic switching requirements.

SUMMARY OF THE INVENTION

According to the present invention there is provided a remote control system for connection to a switched communications network and responsive to communications through the communications system to receive data defining operations to be carried out at a plurality of different controlled locations each connected by way of the switched communications network, each of the controlled locations having interface means responsive to signalling from the communications network to change the status of respective switches characterised in that the control system comprises a control platform arranged periodically to cause a call through the switched communications network to each of the controlled locations and to receive from the respective connected interface means data defining the current status of each of the switches, the platform storing the data so that the current status of each switch is known.

Preferably, the control platform is responsive to calls through the network from system users to inform such a user of the status of each switch at one of the controlled locations. The platform may be responsive to signalling during such a call to store data defining a requirement for a change of the status of one or more of the switches and may also be remotely programmable with a time at which such change of status is required.

In a preferred embodiment, the platform is responsive to signals indicating a customer request for information on the status of a switch to provide an oral announcement defining the nature of apparatus controlled by that switch. The oral announcement is preferably derived from information previously recorded by means of a telephone call through the network from the respective controlled location. Thus the platform is responsive to calls received from a controlled location to permit a system user to record an oral message defining the or each switch at the controlled location which message is stored by the platform for subsequent information of users.

The platform may be arranged on receipt of data from a controlled location to compare the apparent status of switches thereat with the required status and to forward data to the controlled location to cause a change in the status of the switches if the apparent and required status differ.

According to a feature of the present invention there is provided a remote control system comprising a switch and an interface unit for connection to a communications line to a telephone network, the interface unit being responsive to signals received by way of the communications line to control the switch characterised in that the interface is responsive to selective alert signals from the communications line to switch from a first mode in which the interface unit supervises the switch to a second mode, in which the interface unit is responsive to selection signals from the communications line either to return to the communications line signals indicative of the current state of the switch or to receive from the communications line data signals indicative of the required state of the switch.

Preferably the system comprises a plurality of switch control modules each of which comprises control means and a switch, the control means being responsive to signals received from the interface unit to cause the respective switch to operate and/or to return to the interface unit signals indicating, on demand, current status of the respective switch.

Signalling between the interface unit and the switch control modules may be by way of an electrical main distribution circuit and may employ FSK signalling. The FSK signalling may comprise a number of bytes of which one byte is a module designation byte indicating which of the plurality of modules is addressed and a further byte is an operation byte indicating the action required. The bytes may be of unequal length.

In a preferred embodiment, each of the switch control modules controls a plurality of switches and a switch designation byte of signalling from the interface unit may indicate to which of the respective associated switches the action required relates. The required action may be a status report in which case the control means may return FSK signalling to the interface unit indicating the current status of the designated switch.

Each switch control module may include means to permit user selection of a module number indicating the module designation from the interface unit to which the module should respond.

In the first mode of operation, the interface unit periodically transmits a status request byte to each of the remote control units and stores the resulting data indicating the status of each switch in the system in a data store. Should data previously received from the communications line indicate that at a particular time the status of one of the switches in the system is to be changed, the interface unit causes the respective switch control module to be addressed and transmits change instructions in respect of the respective switch by way of the mains distribution circuit.

According to a further feature of the invention there is provided a module for use in a remote control system, the module comprising means for connection to a mains distribution circuit, control means and a switch, the module being responsive to signalling received from the mains distribution circuit to effect a change in the status of the switch.

Preferably, the module includes means for transmitting to the mains distribution circuit signals characterising the current status of the switch and the control means may be responsive to signalling received from the mains distribution circuit to cause status signals to be transmitted.

BRIEF DESCRIPTION OF THE DRAWINGS

A remote control system in accordance with the invention will now be described by way of example only with reference to the accompanying drawings of which.

DETAILED DESCRIPTION OF EXEMPLARY EMBODIMENTS

Figure 1:
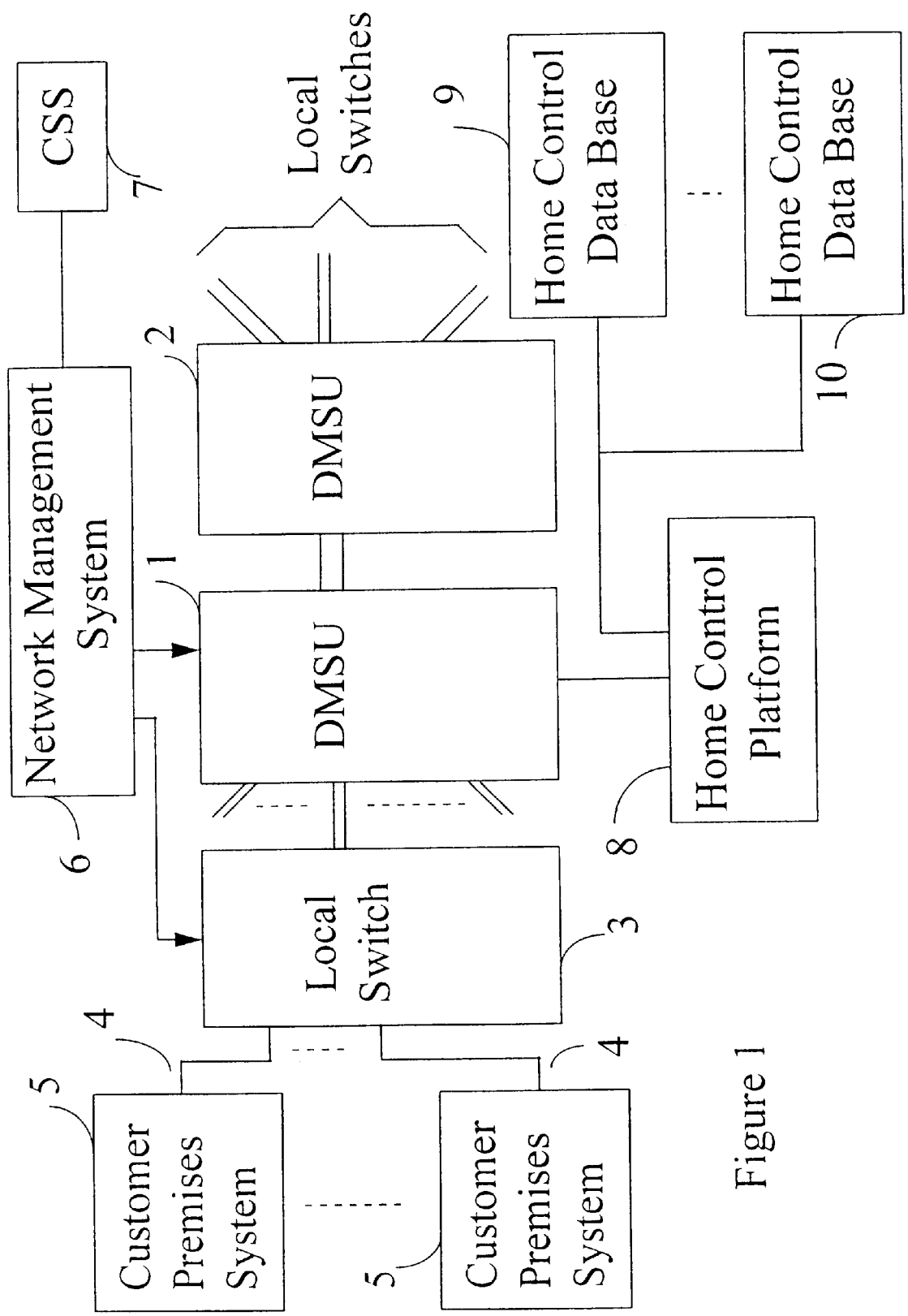
FIG. 1 is a schematic diagram of a telecommunications network connected to two customer premises systems.

Referring first to FIG. 1, a telecommunications network such as the public switched telephone network (PSTN) may comprise a number of digital main switching units (DMSU) 1 and 2 only two of which are shown, which in most cases will be fully interconnected. Each DMSU will be connected to a number of local switches 3 only one of which is shown attached to DMSU 1. The local switches 3 provide access via individual lines 4 to customer premises system 5 for the provision of telephony service. As will be described in detail below, the customer premises systems provide additional services.

The lines 4 may be of copper or optical fibre or any other suitable medium including radio interconnection or a mixture of these.

The DMSUs 1 & 2 and the local switches 3 are responsive to a network management system 6. Requests for new services are received at a customer service system (CSS) 7. The CSS 7 sends requests for new services to the Network Management system 6. The Network Management system 6 sends requests to individual elements in the network so as to configure the individual elements to provide the requested services. In the present invention one of the DMSUs has access to a home control platform 8 which has access to data bases 9 and 10 each of which may be associated with a number of local switches and/or DMSUs (connection not shown) to provide information to the home control platform. The data bases 9 and 10 may of course be co-located with the platform 8. The Network Management system 6, the CSS 7, the home control platform 8 and the databases 9 and 10 are implemented by computer.

In PCT patent application GB95/00853 there is described a method of communicating with apparatus connected to telephone lines in customer premises without providing a ringing signal to cause co-terminated equipment to actuate. The system operates using C7 signalling on data channels of the network and is shown as operating using signalling from the DMSUs 1 and 2 to the local switches 3 to establish the setting up of communications connections to the line 4 to specific customer premise equipment, for example for actuation of a telemetry interface.

Figure 2:
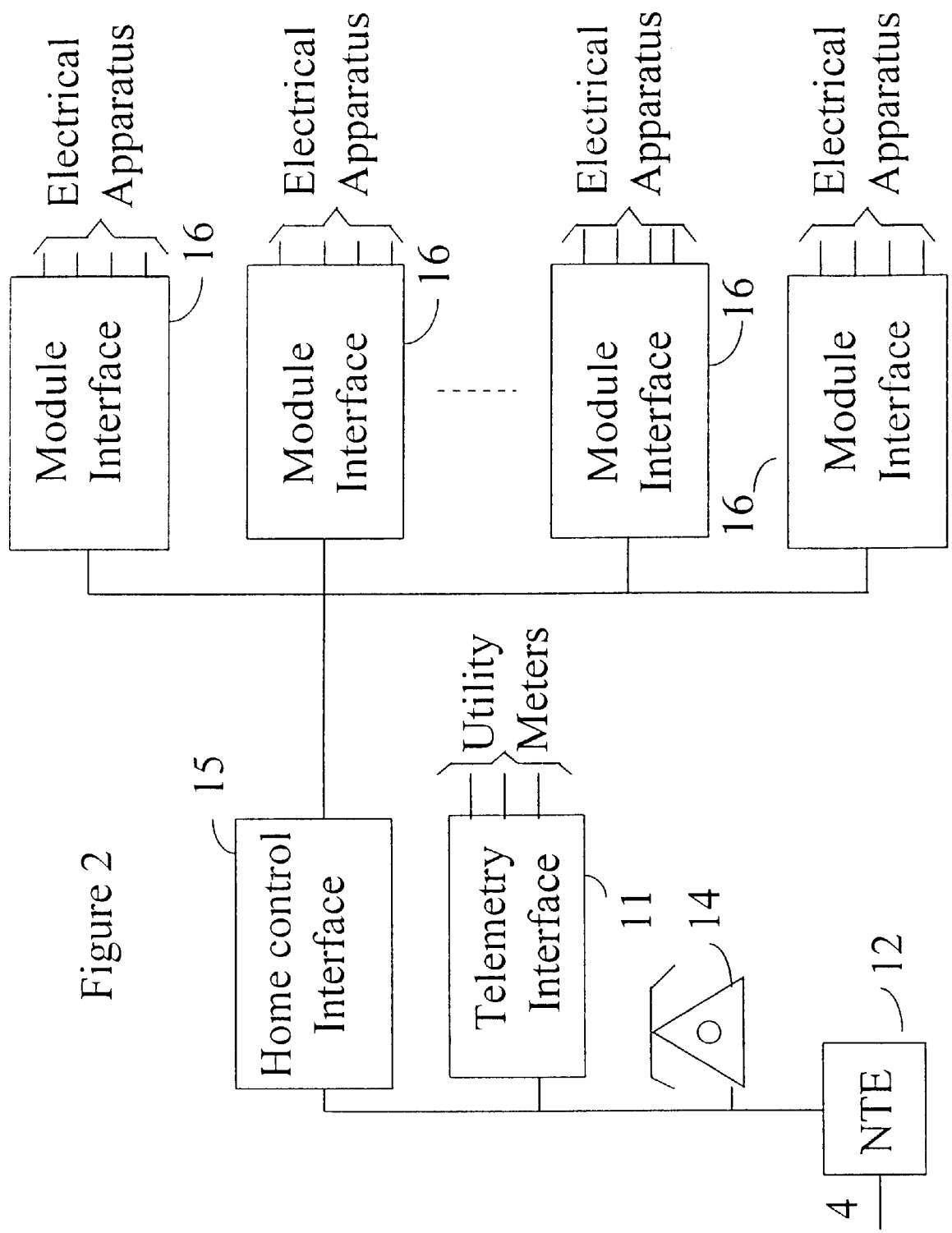
FIG. 2 is a block schematic diagram showing one of the customer premises systems of FIG. 1.

Referring additionally now to FIG. 2 there is shown one of the customer premises systems 5. In the customer premises system 5, the line 4 terminates in typically a wall socket 12 often referred to as a network termination equipment and this may be connected in parallel to telephony equipment 14 a telemetry interface 11 (which does not form part of the present invention) and a home control interface 15 which is the subject of the present invention.

Briefly, the telemetry interface 11 for example responds to specific signals from the local exchange 3 for example a tone signal subsequent to a line reversal to switch on and receive instructions from the network platform for reading utility meters (not shown).

The home control interface 15 similarly reacts to non-ringing network signalling using a different frequency or frequencies for alert purposes subsequent to a line reversal from the exchange 3.

Subsequently received signals comprising data from the control platform 8 provide instructions to the home control interface 15 or request information therefrom.

The home control interface 15 may control some apparatus or more specifically may communicate with a plurality of module interfaces 16 which in turn control other electrical apparatus.

Figure 3:
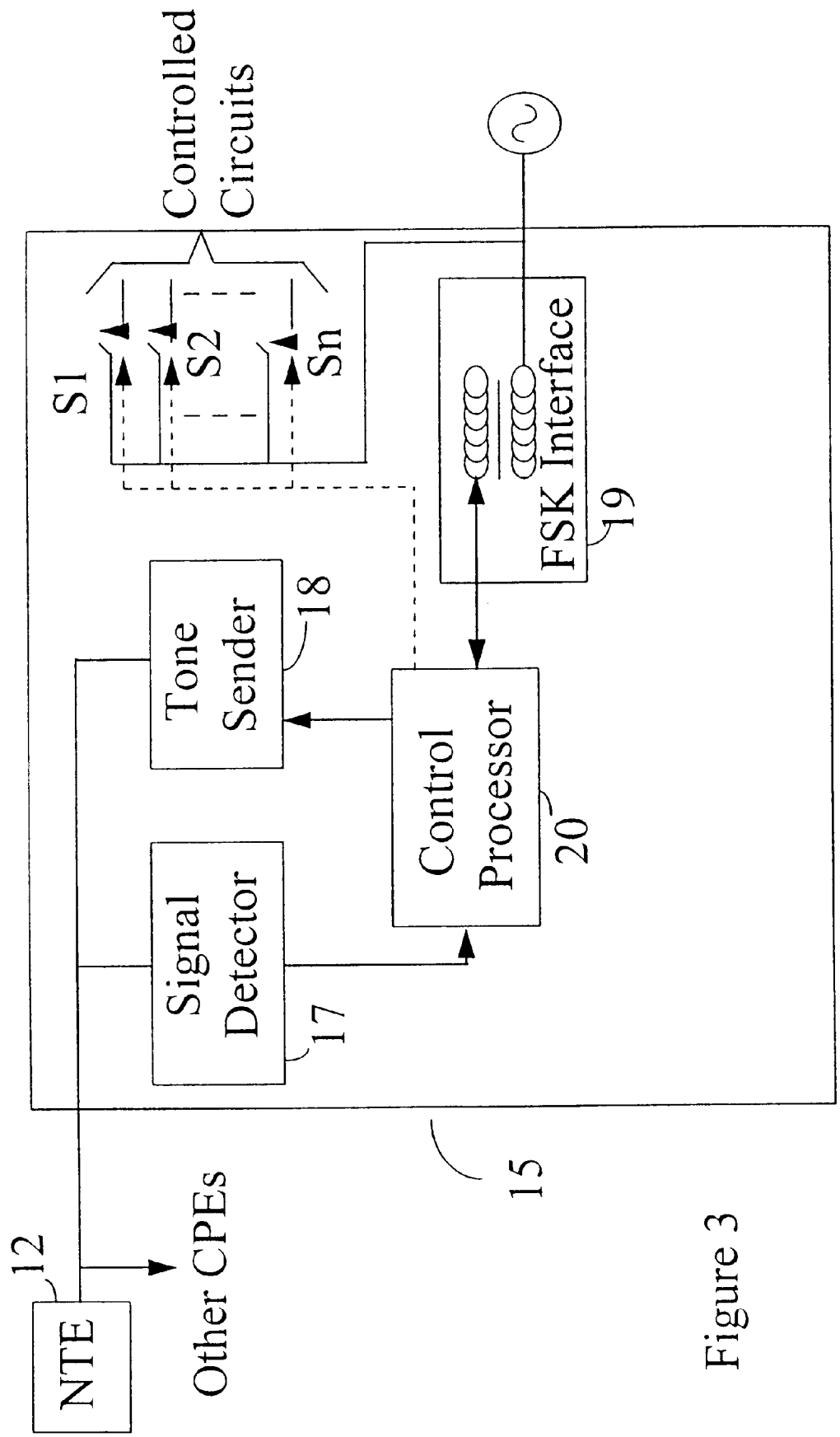
FIG. 3 shows a part of the home control interface of FIG. 2.

Referring now to FIG. 3 the home control interface 15 includes a control processor 20 and signal detector 17, tone sender 18 and a further signalling interface 19 for communication with the module interfaces 16. The interface 15 which is most likely to be powered from a mains circuit through a suitable power supply (not shown) constantly monitors the line from the NTE 12. If the signal detector 17 detects a line reversal, that is to say a switch of the voltage between the A and B legs of the connection from the local switch 3, it will monitor for subsequent information either in the form of frequency shift keying (FSK) signalling or dual tone multi-frequency signalling (DTMF) for signals indicative of home control platform calling. If appropriate alert signals are received then subsequent signals indicate to the control processor 20 action which is required to be taken by the interface 15.

Where information is to be returned by way of the outward termination equipment 12 and the network to the home control platform 8 the tone sender 18 is controlled by the processor 20 to forward such information. The module 15 may directly control some circuits by means of a series of switches S1, S2 . . . Sn and/or may communicate with module interfaces 16 to control circuits attached thereto. The FSK interface 19 receives signals from the control processor 20 which are imposed on the mains circuit of the customer premises system 5 in known manner. Similarly signals from the module interfaces 16 are returned by way of the main circuit using FSK signalling to provide information and/or acknowledgement of control processor signalling.

Figure 4:
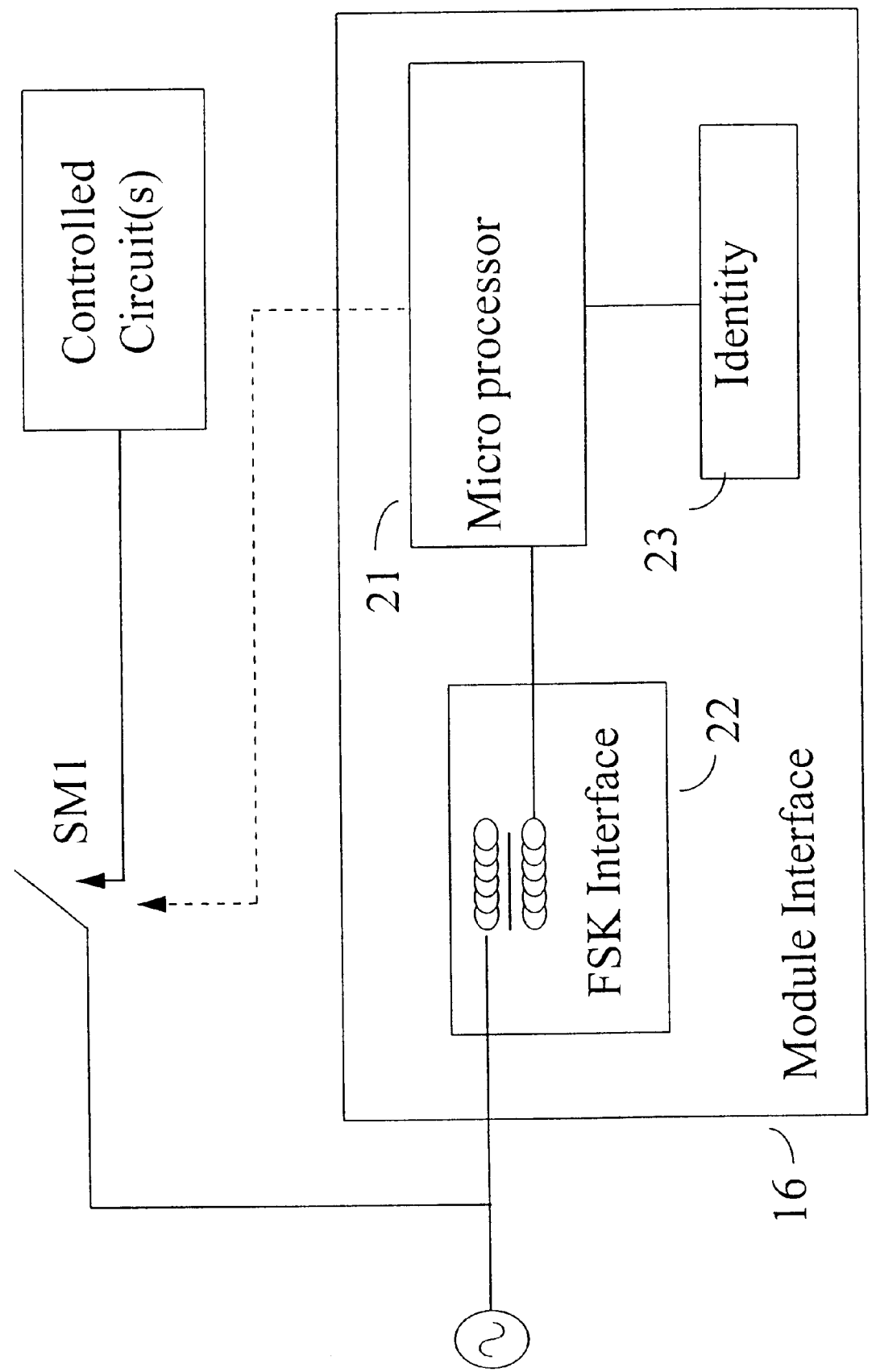
FIG. 4 shows a part of the module interface of FIG. 2.

Turning then to FIG. 4, there is shown one of the module interfaces 16. The module interface 16 comprises a microprocessor 21 and an FSK interface 22, one or more relay switches SM1 and an identity selection mechanism 23 for example comprising a plurality of binary switches which may be manually set to allocate a module number to the interface. Although only one switch SM1 is shown it will be appreciated that a single module interface 16 may be used to control independently a number of circuits by providing a number of switches responsive to data received from the home control platform 8. It will however be appreciated that by providing communication through the domestic mains supply using the FSK interface 19,22 module interface 16 can be made for connection to a normal mains socket of the premises by means of a suitable connector (plug and socket arrangement) and is not therefore limited to a specific piece of apparatus.

However, it will also be realised that manufacturers of equipment such as cookers, video recorders, microwave ovens, and other domestic apparatus could incorporate an FSK interface 22 together with the other components of a module interface during manufacture. Alternatively, the component parts of the module interface 16 could be incorporated into a permanently wired mains socket or other dedicated outlet.

In outline the basic operation of the system allows a customer who has signed up for the home control network service to call in to the home control platform 8 through the public switched telephone network. Once connected to the platform using DTMF signalling for example the customer may identify the controlled customer premises system 5 and subject to suitable security checks using personal identification numbers or pre-arranged features such as calling line identity may then receive information from or give instruction to the home control platform 8. As soon as the platform 8 receives a request for particular customer premises it will establish a call across the network to customer premises system 5 to alert the home control interface 15 and to request a data dump from that interface. The information received from the interface will identify each module interface 16 and the current status of each of the switches associated with those module interfaces. Utilising data in the home control data bases for the particular customer the module interface 16 and switch identities can now be translated into specific items of equipment and information concerning the status of the controlled items may be voiced to the customer should the customer so request.

Alternatively, the customer may key in specific instructions using a DTMF key pad or may receive an indication from the home control platform of the numeric identity associated with each piece of equipment. On request from the customer in relation to specific piece of equipment as identified or in relation to all fitted module interfaces 16, the home control platform 8 may voice to the customer the current status of each of those pieces of equipment and/or any timing information in relation to a requested status change.

Again using DTMF signalling, the customer may notify the platform 8 of requirements for further changes in status at specified times or for immediate action in respect of controlled equipment. In response to each key action by the customer, the platform will voice the name of the requested item, the current status and the status change requested together with any received timing. Full guidance through the system may be provided.

During the customer call to the home control platform, if immediate action is requested or immediately on completion of the customer's call to the platform, the platform will establish a further data call (no-ring call) to the customer premises system 5 and will carry out a data dump to the interface 15 to indicate action to be taken by the home control interface, if any.

In an alternative method of operation, the home control platform 8 may store information concerning the timing of changes to be effected at the customer premises system 5 and in this case my establish a no-ring call at or about the time at which the service operation is required. This may reduce the possibility for localised timing faults occurring in the customer premises system 5 adversely affecting one or more of the modules associated with the interface.

In a further security check, the system may be arranged to request periodic data dumps from the home control interface 15 and to compare the current status of each piece of controlled apparatus with information held concerning the required status by the home control data base 9 or 10.

The operation of the home control platform 8 of FIG. 1 and the home control interface 15 will now be described in greater detail with reference to FIGS. 5A–5E and 6. It is convenient initially to consider the setting up of the definition of the interface modules 16 of FIG. 2 by reference to a call to the home control platform 8 originating from the customer's premises 5 as identified by calling line identification information generated by the local switch indicating to the home control platform that an originating call from a line for which the service is operational is being undertaken.

Figure 5A:
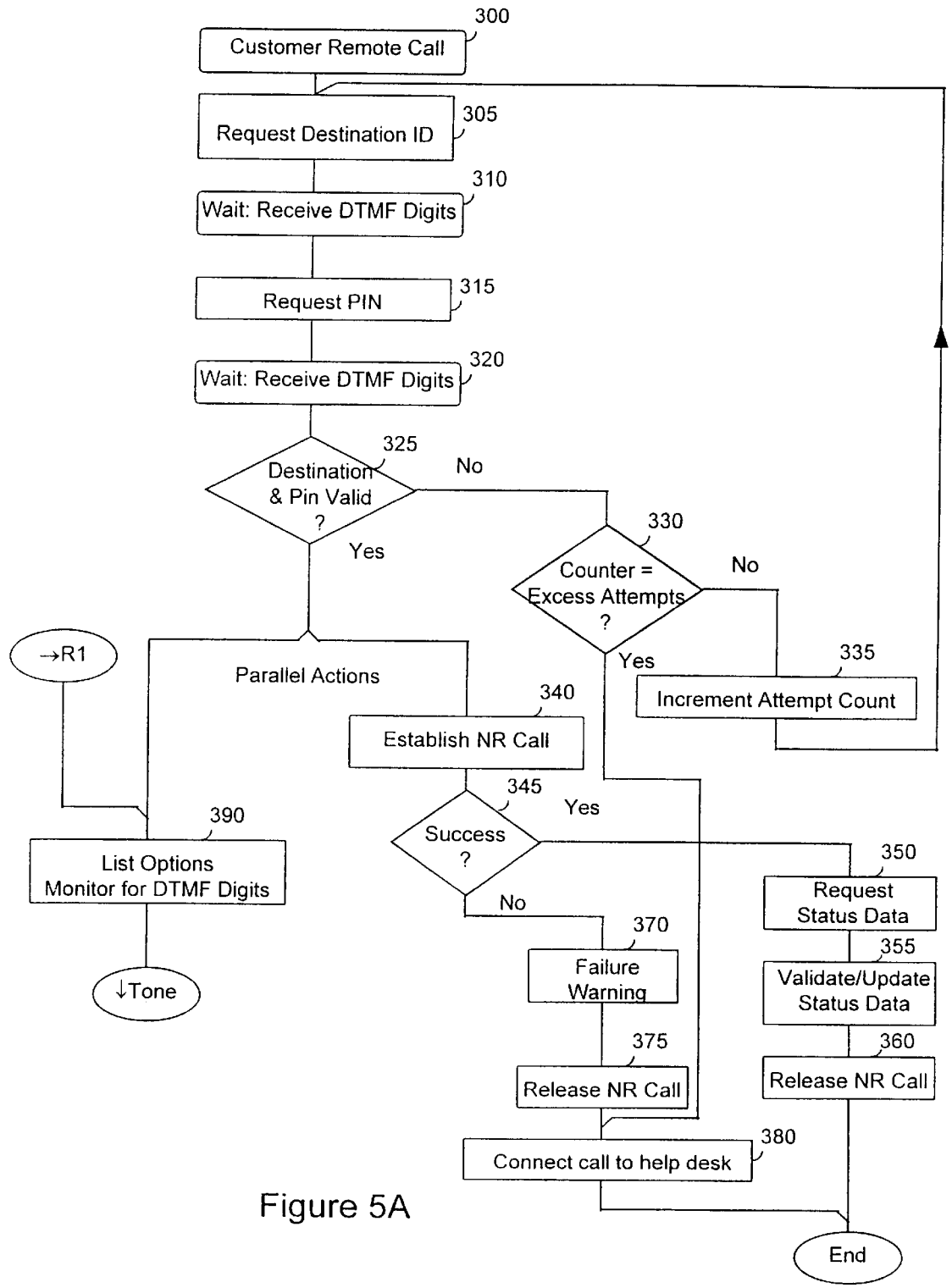
FIGS. 5a–e provide a flowchart showing the operation of the home control platform of FIG. 1.
Figure 5B:
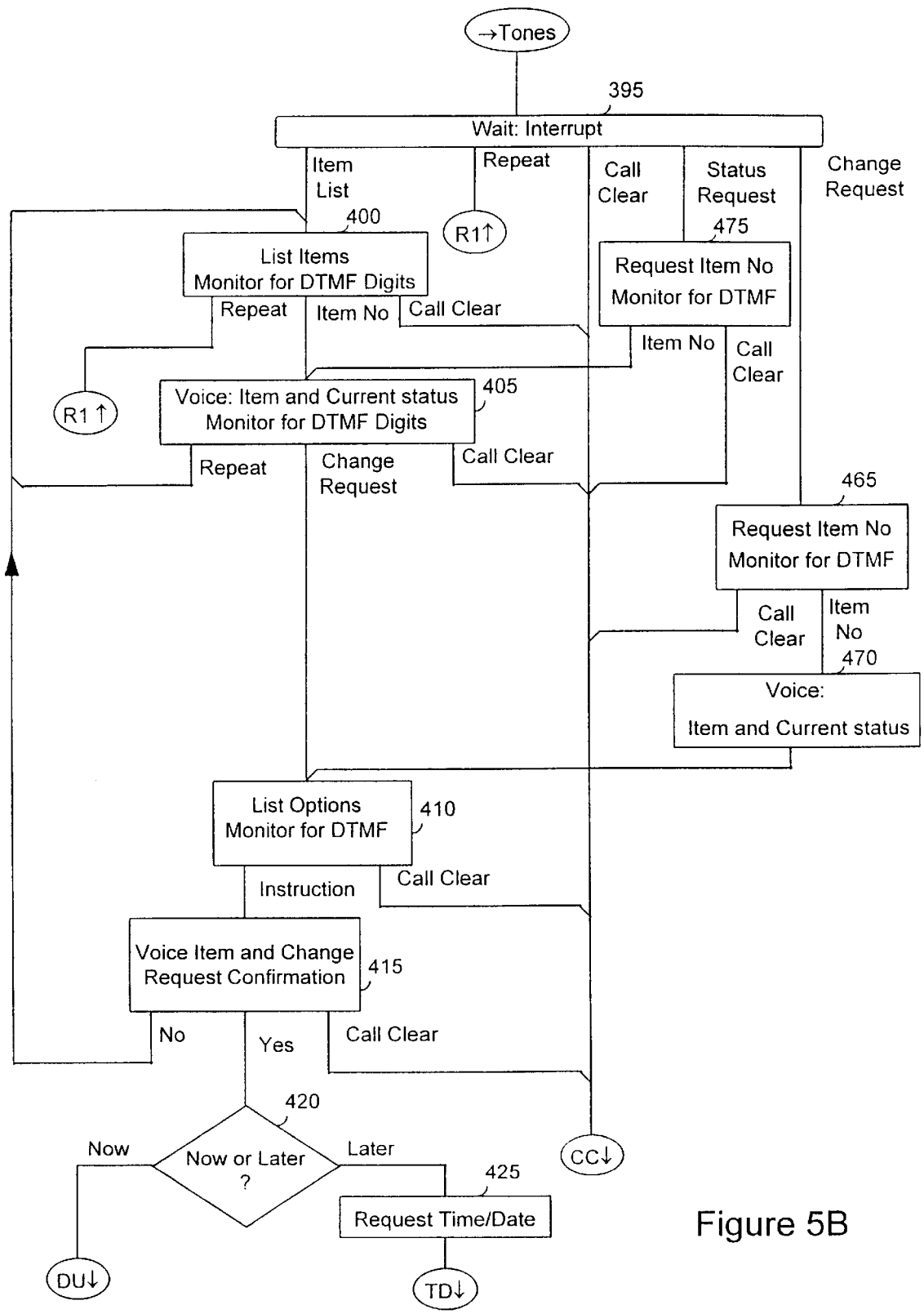
Figure 5C:
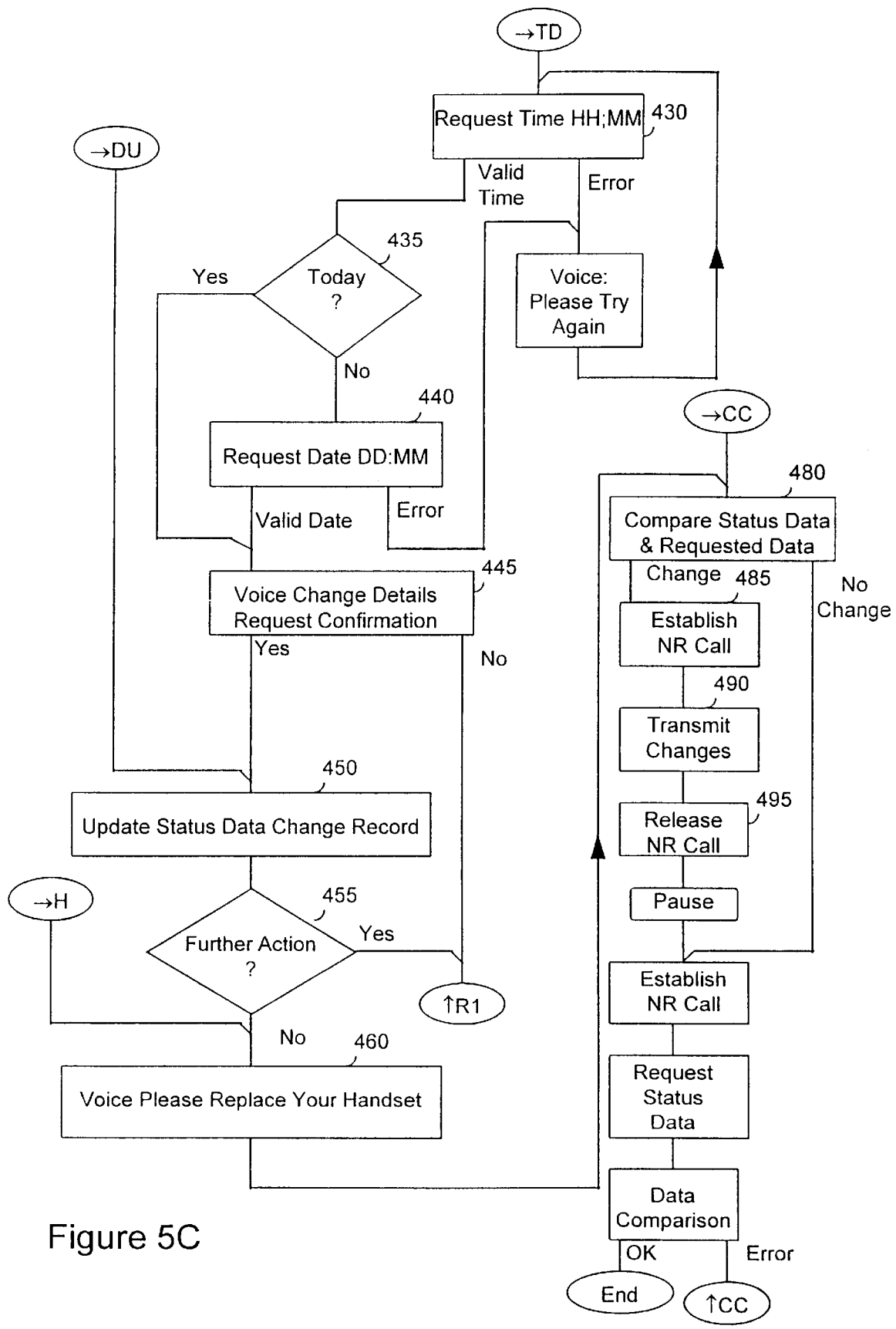
Figure 5D:
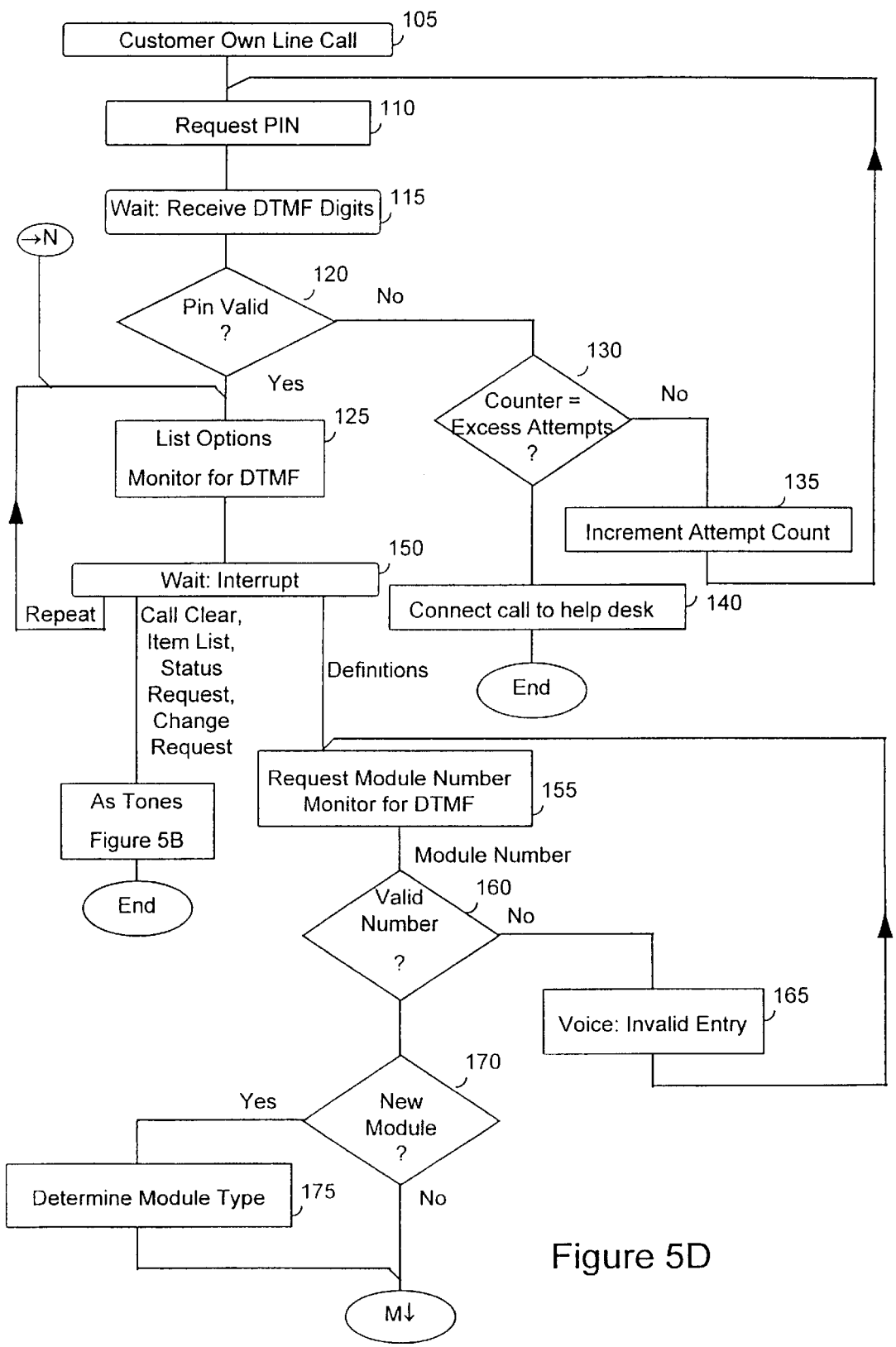
Figure 5E:
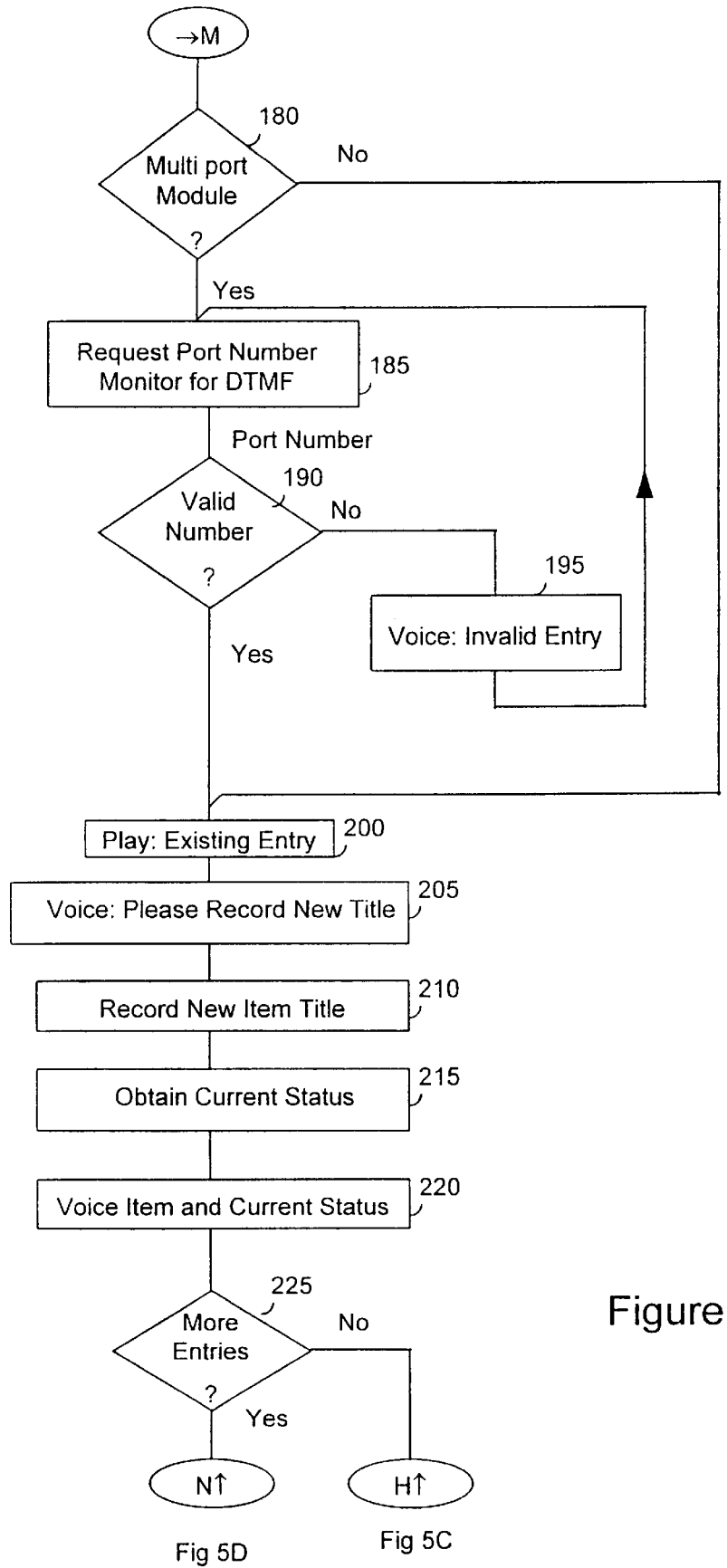

Referring to FIG. 5d, a customer own line call (once it has been confirmed by the customer that the call is not being originated for the purposes of effecting remote control operation in another customer premises) causes the processing action commencing at 105 of FIG. 5d to occur. In order to confirm that the call is being validly made, the home control platform causes a voice message requesting the customer's personal identification number to be keyed in at step 110, which should result in DTMF digits being received from the customer. Assuming that DTMF digits received at 115 are valid as identified at step 120 by reference to corresponding information stored in the data base 9, the platform enters a state at 125 where the options for action are listed in a voice message. Such actions may be a request for a listing of the items and their respective identities, a status request, a change request or a definitions request.

If however at step 120 the PIN received is invalid then, assuming that at step 130, a counter has not reached a predetermined maximum number of attempts, once the counter has been incremented at step 135 the customer will again be invited to enter his PIN. If however at step 130 the number of attempts to enter the PIN exceeds the predetermined maximum then the call is connected to a help desk (step 140) where manual intervention by an operator to establish the bona fide of the calling customer may occur.

Returning now to step 125, the system continues to monitor for DTMF tones indicating required customer action which may be a request for a repeat of the options, in which case the list previously mentioned is repeated. If, however, the customer requests to add or change definitions as indicated by the tone signals sent in response to the options list at step 150 the system will request the customer to enter the module interface number. The module interface number is likely to be in the range of 1 to 16 typically such that in subsequent operations it can be represented by four-bit binary code. Thus when DTMF signals are again received at step 155 in the form of a module interface number, once its validity has been confirmed at step 160, the control platform 8 determines whether the module interface number exists or whether the keyed module entry is for a new module interface. For the avoidance of doubt, it is here noted that, referring briefly to FIG. 4, the entered module interface number corresponds to the identity 23 of the module shown in FIG. 4 which may be manually set by the customer. If a new module interface has been added to the system, then at program step 175 the home control platform 8 may exchange a data dump request with the home control interface 15 in the customer's premises to enable it to determine the type of module, or indeed whether the module is currently connected. Having determined the module type or if the module is an existing module as previous indicated, the system may determine whether the module is one having a single operational switch or has more than one port. If the module has more than one port then the customer receives a voice request at step 185 to enter the port number, probably in the range 1 to 4 which may be indicated by two binary digits in subsequent operations. Again at step 190, when a DTMF indication of the value of the port number is received its validity is checked and provided that a number in the valid range has been received at step 200, the existing digitally stored voice identification (if any) of the module and port will be transmitted to the customer.

It is here noted that at both steps 160 and 190, if the customer enters a number which is out of range or the system determines that the requested module does not exist, as determined from the data dump from the home control interface 15, it will return a voice message indicating that the entry is invalid and also the reason for its invalidity and will again request the module number or port number as appropriate. Returning now to step 200, once the existing entry has been played the customer is invited by voice message to record a new title and at step 210 any voice message received from the customer is digitally stored in the home control data base 9 or 10 against the specified module and/or port numbers. The current status of the newly recorded item (that is the status of the particular module and port as determined from the latest data dump) is now obtained at step 215 and together with the customer defined voice title will now be broadcast back at step 220. The customer may be invited to make further entries at step 225 and will therefore be returned to step 125 where the options for further action are listed and if not requiring to make further changes to operational data in invited to replace the handset of the telephone by reference to step 460 et seq of the program shown in FIGS. 5a to 5c.

It will be noted that for security reasons the customer cannot change module definitions remotely but only from the customer premises system 5 at which the service is being provided.

Turning now to FIGS. 5a to 5c, if the customer wishes to effect a change in the status of one or more of the controlled items attached to any of the modules 16, on calling the platform 8 at step 305 the platform requests the destination identification, that is to say the telephone number of the customer premises system 5 to which the service is connected. An immediate connection to the appropriate home control data base 9 may be made (not shown) to obtain relevant data and after receipt of the customer identification (step 310) the customer may be requested, at step 315, to enter a PIN as previously described with reference to FIG. 5d, step 110. In a similar manner to FIG. 5d steps 120 to 135, steps 325, 330 and 335 relating to the validity of the destination PIN and any failure of the customer to correctly identify the destination PIN will result in a repeat attempt to obtain valid information and if not connection of the call to the manned help desk. Assuming now that a valid destination PIN is entered at step 325, the system attempts to establish a data call (no ring call) across the network to the customer premises system 5 to effect an interchange of data with the home control interface 15. Thus at step 340 a no ring call is established via the DMSU1 and local switch 3 and such other parts of the network as necessary to the customer premises system 5 without providing a ringing signal to operate telephony apparatus.

Figure 6:
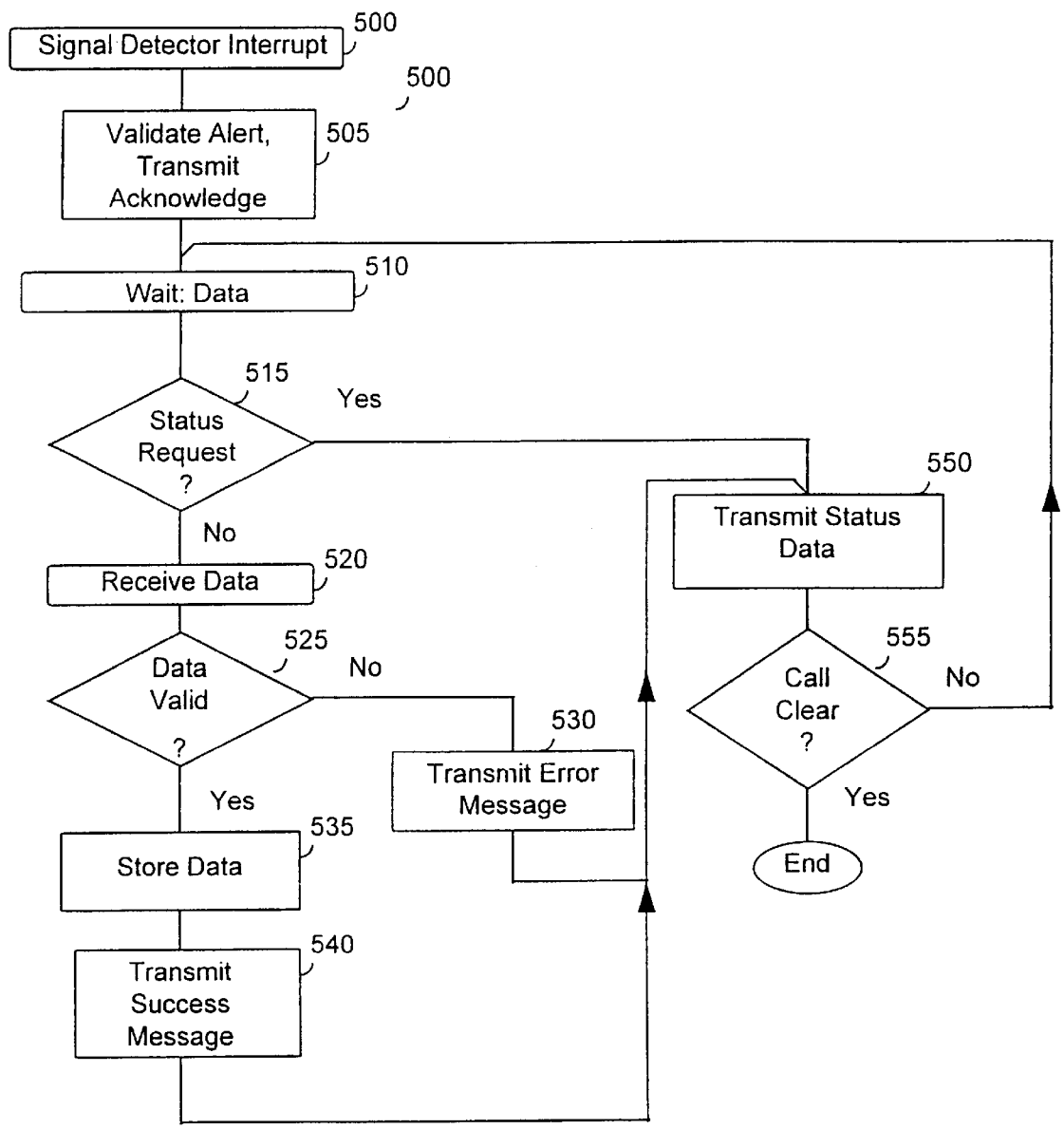
FIG. 6 is a flowchart showing the operation of the control processor of FIG. 3.

Thus referring additionally to FIG. 3 and to FIG. 6, when the signal detector 17 receives an alert by way of the network termination equipment 12 detecting a line reversal followed by valid tone signals indicating a home control interface call an interrupt is forwarded to the control processor 20 as indicated at step 500. The control processor 20 validates the alert and returns an acknowledge signal using the tone sender 18. In the platform 8 at step 345 the transmitted acknowledge signal results in a status data request being forwarded at step 350, which is again detected by the signal detector 17 and forwarded to the control processor 20, which at step 515 responds by transmitting current status data in respect of all connected module interfaces back to the control platform at step 550. At the control platform 8 the transmitted status data is validated and the current status of the module interfaces at the customer premises is stored and at step 360 the call is released resulting in the home control interface 15 returning to its normal operational state at step 525. The gathering of the status data transmitted will be described hereinafter.

If, at step 340, the system fails to establish a no-ring call and/or no response is received from the customer premises system 5, then at step 370 a failure warning may be broadcast to the calling customer. After release of the no-ring call attempt, at step 375, the customer is connected to the manual help desk as hereinbefore referred.

In parallel with the establishment of no-ring call to determine the current status of the module interfaces and ports at customer premises system 5, the system lists options at step 390 and waits, at step 395, for tones to be received from the customer.

The options list at 390 will be similar to that at step 125 of FIG. 5d, except that the customer is not offered the opportunity to change the definitions of any of the modules or ports. Therefore, at step 395, the options as indicated by tones received from the customer are, for example, an item list, a status request or a change request. The customer may of course request that the option list be repeated, in which case the system returns to step 390 which it may do after a period of time if no DTMF signalling is received at step 395 in any event.

Consider first the customer request for an item list at step 395, the system calls up from the data base the digitised voice indication given previously by the customer in respect of each module and port and will voice the appropriate module interface numbers, port numbers and identification back to the customer at step 405, together with the current status of those items as determined during the course of the immediately established no-ring call. The customer may enter a change request at any point during the call or may request that the listed items be repeated. If a change request is received the system may list the options to the customer at step 410 and will monitor for tones to confirm the instruction. For example, the system may voice 03,1 "lounge light is currently off", "key 0 to leave", "key 1 to turn on". If the customer keys 1 or 0 then the appropriate response is given at step 415 without voicing further the module interface and port number portion. Thus at step 415, a digitised message "lounge light on" or "leave lounge light off" press 1 to confirm or "0 to cancel" may be voiced to the customer. If the customer presses 0 then the system may return to listing items at step 400. If the customer presses 1 then, at step 420, the system may ask for further information i.e. press 1 for the change to be made now or 0 for a change to be made later. If the change is to be made later then a voice request for time and date of change may be made at step 430 requesting first the time in the form time hh mm i.e. hour hour minute minute and provided a valid time is entered requesting confirmation of date either today a subsequently in the form of date and month information. Having received all of the required data then the system any cause change details to be voiced back to the customer in a suitable form, for example, "turn lounge light on at 1900 hours today, press 1 to confirm press 0 to cancel". This feature is shown at step 445 and if the customer confirms the action to be taken, then the status change details will be recorded at step 450. The customer may now be asked if further action is required at step 455 and if so will be returned to the options list of step 390. While a simple listing has been described, it will be appreciated that any previously requested changes including date and time information may also be transmitted following transmission of the current status information to the customer. Note that at step 460 the customer is requested to replace the handset.

Returning now to step 395, if the customer directly inputs a change request, the item number is requested without providing a list of items to the customer. Thus at step 465 the item number is requested and when received the item and current status of that particular item is voiced at step 470 as hereinbefore described. Further note that the customer may simply request the status of an item at step 395, in which case when the item number is received at step 475, the specific item and current status (together with any change information currently stored) is voiced at step 405.

If at any point during the course of a call to the control platform 8 the customer clears or indicates (see step 225 and step 445) that further information change is not required, then at step 480 the current status data and requested data are compared and changes to be made, if any, are transmitted by the establishment of a no-ring call at steps 485 to 495. Thus at step 515 of FIG. 6, if the home control interface 15 does not receive a status request at step 515 it will await the transmission of the data at step 490 and will check the validity of the data as received at steps 520 and 525. If valid data is not received from the home control platform, as indicated at step 530, an error message will be transmitted back to the home control platform. If however valid data is received, then the data is stored for action as hereinafter described at step 535, and a success message, step 540, is forwarded to the home control platform. The transmission of either an error or success message is followed by the transmission of status data as currently held, which will not reflect any updating made by the system until such time as a watchdog interrupt (hereinafter described) activates the status changes.

Turning to the operation of the home control platform at FIG. 5c, a period of time will elapse before a further no-ring call is established by the home control platform at step 600. After which at step 605 a no-ring call is again established and status data is requested at step 610 as hereinbefore described. This enables a data comparison to be made between the data stored in the home control data base in respect of the customer premises system 5 and the current status at step 615 and if any differential is detected for further attempts to be made to cause the home control platform to reflect the customer's request.

It is here noted that although not shown, since several consecutive operations of a particular module interface and port may have been requested by the customer, each operation being separated by a period of time. The platform periodically goes through the steps of requesting status data carrying out a data comparison and forwarding new instructions as per steps 610, 615 and 480 to 605 to ensure that the modules in the customer premises system 5 reflect the customer's wishes.

Referring now to FIG. 3, the control processor 20 includes a real time clock and at periodical intervals the watchdog timer causes the control processor 20 to enter a scan and change program. Then, the module interface number is set to the first possible module that is "0000" and the outlet number is similarly set to the first possible outlet, again "00". Then a status request is sent by way of FSK interface 19 to the domestic mains electricity circuit in the form of module and outlet number. Each of the modules 16 will receive via its own FSK interface 22 the transmitted module interface number and outlet number and further information identifying this as a status request. Note that the module interface number as previously mentioned is the identity stored in the identity store 23 which may be a series of switches operable by the customer or preset data in some other manner.

The microprocessor 21 will respond to the request by indicating the current status of the module and port (if more than 1) in the form of an N bit binary code identifying module number, outlet number and current status. This response is received by the microprocessor 20 in the home control interface 15 and is stored. The received response is compared to the requested data in respect of the module and outlet numbers and if they are equal or the response indicates that the identified switch is in a manual override action to change the particular outlet switch is not required. Thus no further action is taken. However, if an unequal status response is received from an automated unit which is active then a change signal is sent in respect of the module and outlet by way of the FSK interfaces 19 and 22 causing the microprocessor 21 to change the state of the switch SM1 to SM4 as appropriate. After transmitting the change signal the processor 20 determines whether the module currently being accessed has further outlet switches and if so increments the outlet number and repeats the process as described above from the step of sending a status request through the step of determining whether the module being accessed has further outlet switches in respect of the next outlet on the module number. Once all of the outlets of a first module have been tested and updated if applicable, the microprocessor determines whether the maximum modules have been interrogated and if not will increment a module number and repeat the process as described above until all possible modules and outlets have been tested. Note that if there is no response from the module or a module is not connected the system steps on to examine further modules.

This periodic scanning of all possible modules ensures that a new module is connected to the system it is quickly identified and at any time when a remote call as hereinbefore described with reference to FIG. 5 is received at the customer premises system 5 the home control interface 15 is able to return the current status of all modules and control connections.

What is claimed is:

1. A remote control system for connection to a switched communications network and responsive to communications through the communications network to receive data defining operations to be carried out at a plurality of different controlled locations each connected by way of the switched communications network, said system comprising:

interface means at each of the controlled locations, said interface means including a connection to the communications network and a transmitter/receiver coupled for communication on an electrical mains circuit;

at least one switch control module at each of the controlled locations, each said switch control module including at least one respective switch and a respective transmitter/receiver coupled for communication with the electrical mains circuit;

the interface means periodically polling each switch control module to cause the module to return data defining the status of each respective switch; and a control platform arranged periodically to cause a call through the switched communications network to each of the controlled locations and to receive from the respective connected interface means data defining the current status of each of the switches, the platform storing the data so that the current status of each said switch is known.

2. A remote control system as in claim 1 wherein the control platform is responsive to calls through the network from system users to inform such a calling user of the status of each switch at one of the controlled locations.

3. A remote control system as in claim 2 wherein the platform is responsive to signals indicating a customer request for information to provide an oral announcement defining the nature of apparatus controlled by a switch whose status is requested.

4. A remote control system as in claim 3 wherein the oral announcement is derived from information recorded previously.

5. A remote control system as in claim 4 wherein the previously recorded information is recorded by means of a telephone call to the platform through the network.

6. A remote control system as in claim 4 wherein the oral announcement is derived from information previously recorded by a telephone call through the network from the respective controlled location.

7. A remote control system as in claim 4, in which the platform is responsive to calls received from a controlled location to permit a system user to record an oral message defining each switch at the controlled location which message is stored by the platform for subsequent dissemination.

8. A remote control system as in claim 2 wherein on receipt of a call through the network from a system user the control platform is arranged to establish a call through the network to the defined respective controlled location to request data defining the current status of each of the switches.

9. A remote control system as in claim 1 wherein the control platform is responsive to receipt of data from the controlled location to compare the status of respective switches at the controlled location with the required status and if a difference between the actual and required status is detected to forward data to the controlled location to cause a change in the status of such switches.

10. A remote control system as in claim 1 wherein the platform is responsive to signalling received during a call through the network from a system user such data defining a requirement for a change of status of one or more of the switches.

11. A remote control system as in claim 10 wherein the platform is responsive to additional signalling to store a time at which the change of status of one or more of the switches is required.

12. A remote control system comprising:

an interface unit for connection to a communication line to a telephone network and including means to transmit and receive signals by way of an electrical main distribution circuit;

at least one switch control module comprising control means and at least one switch, the control means being responsive to signals received from the electrical main distribution circuit to cause each respective switch to operate and to return to the interface unit signals indicating on demand current status of the respective switch;

the interface unit being responsive to signals received by way of the communications line indicating instructions to control switches associated with respective connected modules; and the interface unit being responsive to selective alert signals from the communications line to switch from a first mode in which the interface unit supervises the at least one module to a second mode in which the interface unit is responsive to selection signals from the communications line either to return to the communications line signals indicative of the current state of each switch associated with the at least one module or to receive from the communications line data signals indicative of the required state of said switches.

13. A remote control system as in claim 12, in which the signalling between the interface and the switch control modules is by means of a frequency shift keyed signal superimposed upon the electrical main distribution circuit.

14. A remote control system as in claim 13 wherein the frequency shift keyed signalling comprises a number of bytes of which one byte is a module designation byte indicating which of the plurality of modules is addressed and a further byte is an operation byte indicating action required.

15. A remote control system as in claim 14, in which each of the switch control modules controls a plurality of switches and a further byte of signalling from the interface unit indicates to which of the respective associated switches the action required relates.

16. A remote control system as in claim 14 wherein the data bytes are of unequal length.

17. A remote control system as in claim 12 wherein the required action is a status report the respective control means of the addressed switch control module returns frequency shift keyed signalling to the interface unit indicating the current status of a designated switch.

18. A remote control system as in claim 17 wherein the frequency shift keyed signalling is imposed upon an electrical mains distribution circuit.

19. A remote control system as in claim 12 wherein the at least one switch control module includes means to permit user selection of a module number indicating the module designation from the interface unit to which the module should respond.

20. A remote control system as in claim 12, in which in the first mode of operation the interface unit periodically transmits a status request to each of the at least one switch control module and stores the resulting data indicating the status of each switch in the system in a data store.

21. A remote control system as in claim 20 wherein the interface unit is responsive to stored data previously received from the communications line to cause the status of one of the switches in the system to be changed at a predetermined time by transmitting change information to a respective switch control module by way of the mains distribution circuit at the appointed time.

* * * * *